United States Patent [19]

Kondo

[11] Patent Number: 4,681,249

[45] Date of Patent: Jul. 21, 1987

[54] VAPOR PHASE SOLDERING APPARATUS

[75] Inventor: Kenshi Kondo, Tokyo, Japan

[73] Assignee: Nihon Den-Netsu Keiki Co., Ltd., Tokyo, Japan

[21] Appl. No.: 870,897

[22] Filed: Jun. 5, 1986

[30] Foreign Application Priority Data

| Jun. 8, 1985 | [JP] | Japan | 60-123517 |
| Jun. 8, 1985 | [JP] | Japan | 60-123518 |
| Oct. 28, 1985 | [JP] | Japan | 60-239348 |
| Jan. 20, 1986 | [JP] | Japan | 61-7876 |

[51] Int. Cl.$^4$ .............................................. B23K 1/12
[52] U.S. Cl. .................................. 228/37; 228/180.1; 228/240
[58] Field of Search .................. 228/33, 35, 36, 37, 228/180.1, 180.2, 240; 118/410, 411, 412

[56] References Cited

U.S. PATENT DOCUMENTS

| 3,866,307 | 2/1975 | Pfahl et al. | 228/37 |
| 4,077,467 | 3/1978 | Spigarelli | 228/180.1 |
| 4,090,843 | 5/1978 | Chu et al. | 228/180.1 |
| 4,115,601 | 9/1978 | Ammann et al. | 228/180.1 |
| 4,315,042 | 2/1982 | Spigarelli | 228/37 |
| 4,389,797 | 6/1983 | Spigarelli et al. | 118/729 |

*Primary Examiner*—M. Jordan
*Attorney, Agent, or Firm*—Stephen F. K. Yee

[57] ABSTRACT

A vapor phase soldering apparatus for soldering printed circuit boards, including a vessel for containing a heat transfer liquid, partition plates provided within the vessel for dividing the inside space of the vessel into inner and outer chambers which are in fluid communication with each other at upper and lower portions of the partition plates, a heater provided in the inner chamber to heat and to vaporize the heat transfer liquid in the inner chamber, a cooler provided within the outer chamber to cool and to condense vapors of the heat transfer liquid in the outer chamber, and a conveyor for conveying printed circuit boards through the vessel, whereby the printed circuit boards are soldered in the inner chamber by contact with the vapors of said heat transfer liquid, and the vapors escaped from the inner chamber to the outer chamber are condensed in the outer chamber and recycled to the inner chamber.

6 Claims, 8 Drawing Figures

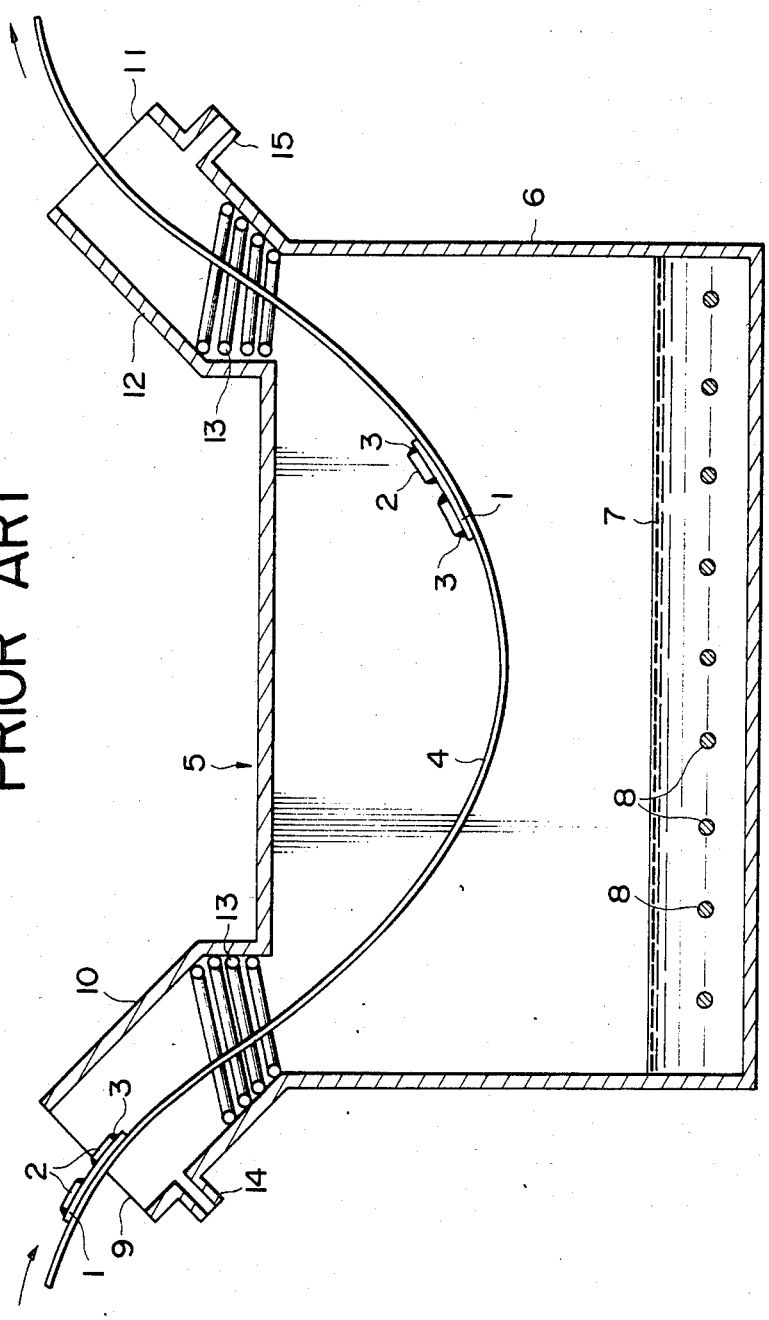

VAPOR PHASE SOLDERING APPARATUS

BACKGROUND OF THE INVENTION

This invention relates generally to a soldering apparatus and, more specifically, to a vapor phase soldering apparatus adapted for soldering printed circuit boards bearing electric chips and components temporarily mounted thereon by solder preforms.

A vapor phase soldering method is of a type in which the objects to be soldered are heated to a temperature appropriate for the soldering operation by condensing thereon hot vapors of a heat transfer liquid and is disclosed, for example, in U.S. patent specification No. 3,866,307.

Illustrated in FIG. 8 and designated generally by the reference numeral 5 is a conventional vapor phase soldering apparatus having a belt conveyor 4 for transferring through the apparatus printed circuit boards 1 on which electric chips 2 such as resistors and capacitors are temporarily mounted by means of solder preforms 3. Denoted at 6 is a vessel for containing a heat transfer liquid 7 having a boiling point higher than the melting point of the soldering preforms 3. The heat transfer liquid 7 is, for example, Florinate (SUMITOMO 3M, Inc.). Designated at 8 is a heater for heating the heat transfer liquid 7 to generate vapors 7a thereof, at 9 is an entrance opening for the printed circuit boards 1, at 10 is an entrance transfer passage, at 11 is an exit opening for the soldered printed circuit boards, at 12 is an exit transfer passage, at 13 is a cooler including cooling coils for condensing the vapors 7a, and at 14 and 15 are discharge ducts through which uncondensed vapors 7a are forcibly discharged without permitting outflows through the entrance and exit openings 9 and 11.

With the conventional soldering apparatus described above, the heat transfer liquid 7 is boiled and evaporated by the heater 8 to form saturated vapors 7a which serve to melt the solder preforms 3 on the printed circuit board 1 travelling through the vessel 6 by transferring the heat of evaporation thereto. When the printed circuit board 1 is discharged from the vessel 6 through the opening 11, the solder 3 is again solidified, securely fixing the chips 2 to the printed circuit board 1. The vapors 7a are condensed by the cooler 13 and the condensate drains back to the vessel 6.

The conventional soldering apparatus of the above-mentioned type has a problem that the transfer path is curved because the entrance and exit openings 9 and 11 are required to be provided at an upper portion of the vessel 6 in order to prevent the escape of the vapors 7a which have a higher density than air. If the openings 9 and 11 are provided at a lower positions so as to provide a straight path of travel of the printed circuit boards 1, a significant amount of the vapors 7a of the heat transfer liquid will be discharged out of the apparatus through the discharge ducts 14 and 15. Since the heat transfer liquid is very expensive, the replenishment thereof for making up for the discharged vapors incurs an uneconomically high process cost.

SUMMARY OF THE INVENTION

In accordance with the present invention there is provided an apparatus for soldering printed circuit boards having electric components mounted thereon with solder preforms, comprising:

a closed vessel for containing a heat transfer liquid having a boiling point higher than the melting of the the solder preforms;

vertical partition means provided within said vessel for dividing the inside space of said vessel into an inner, heating chamber defined by said partition means and an outer, cooling chamber defined between said partition means and said vessel;

an opening provided in a lower portion of said partition means so that the heat transfer liquid in said cooling chamber may enter said heating chamber therethrough;

front and rear apertures provided in upper portions of said partition means to allow the passage of the printed circuit boards therethrough;

heating means provided in said heating chamber to heat the heat transfer liquid in said heating chamber to a temperature higher than the boiling point of the heat transfer liquid;

cooling means provided within said cooling chamber for condensing vapors of the heat transfer liquid in said cooling chamber;

entrance conduit means having an entrance port for printed circuit boards at its one end and connected to said vessel at its the other end;

exit conduit means having an exit port for printed circuit boards at its one end and connected to said vessel at its the other end; and conveying means adapted for conveying printed circuit boards successively through said entrance port, entrance conduit means, cooling chamber, front aperture, heating chamber, rear aperture, cooling chamber, exit conduit means and exit port, whereby said heating means heat the heat transfer liquid in said heating chamber to vaporize same and to form saturated vapors of said heat transfer liquid within said heating chamber, the printed circuit boards conveyed by said conveying means to said heating chamber being brought into contact with said saturated vapors so that the solder preforms can melt, and the vapors of said heat transfer liquid which escaped from said heating chamber to said cooling chamber through said front and rear apertures are cooled and condensed by said cooling means in said cooling chamber for recovery.

In another aspect, the present invention provides an apparatus for soldering printed circuit boards having electric components mounted thereon with solder preforms, comprising:

a first closed vessel for containing a first heat transfer liquid having a boiling point lower than the melting of the the solder preforms;

a second closed vessel for containing a second heat transfer liquid having a boiling point higher than the melting of the the solder preforms;

first vertical partition means provided within said first vessel for dividing the inside space of said first vessel into an inner, first heating chamber defined by said first partition means and an outer, first cooling chamber defined between said first partition means and said first vessel;

second vertical partition means provided within said second vessel for dividing the inside space of said second vessel into an inner, second heating chamber defined by said second partition means and an outer, second cooling chamber defined between said second partition means and said second vessel;

a first opening provided in a lower portion of said first partition means so that the first heat transfer liquid in said first cooling chamber may enter said first heating chamber therethrough;

a second opening provided in a lower portion of said second partition means so that the second heat transfer liquid in said second cooling chamber may enter said second heating chamber therethrough;

a pair of first front and first rear apertures provided in upper portions of said first partition means to allow the passage of the printed circuit boards therethrough;

a pair of second front and second rear apertures provided in upper portions of said second partition means to allow the passage of the printed circuit boards therethrough;

first heating means provided in said first heating chamber to heat the first heat transfer liquid in said first heating chamber to a temperature higher than the boiling point of the first heat transfer liquid;

second heating means provided in said second heating chamber to heat the second heat transfer liquid in said second heating chamber to a temperature higher than the boiling point of the second heat transfer liquid;

first cooling means provided within said first cooling chamber for condensing vapors of the first heat transfer liquid in said first cooling chamber;

second cooling means provided within said second cooling chamber for condensing vapors of the second heat transfer liquid in said second cooling chamber;

entrance conduit means having an entrance port for printed circuit boards at its one end and connected to said first vessel at its the other end;

exit conduit means having an exit port for printed circuit boards at its one end and connected to said second vessel at its the other end;

connecting conduit means extending between said first and second vessels to allow the passage of the printed circuit boards from said first to second vessels therethrough and provided with a cooler for condensing vapors of said first and second heat transfer liquids therewithin; and conveying means adapted for conveying the printed circuit boards successively through said entrance port, entrance conduit means, first cooling chamber, first front aperture, first heating chamber, first rear aperture, first cooling chamber, connecting conduit means, second cooling chamber, second front aperture, second heating chamber, second rear aperture, second cooling chamber, exit conduit means and exit port, whereby said first and second heating means heat the first and second heat transfer liquids in said first and second heating chambers, respectively, to vaporize same and to form saturated vapors of said first and second heat transfer liquids within respective heating chambers, the printed circuit boards conveyed by said conveying means being brought into contact first with said saturated vapors of said first heat transfer liquid so that the solder preforms can be preheated and then with said saturated vapors of said second heat transfer liquid so that the preheated solder preforms can melt, and the vapors of said first and second heat transfer liquids which are escaped respectively from said first and second heating chambers to said first and second cooling chambers, respectively, through said first and second front and rear apertures, respectively, are cooled and condensed by said first and second cooling means in said first and second cooling chambers, respectively, for recovery.

BRIEF DESCRIPTION OF THE DRAWINGS

FIG. 8 is a side sectional view of a prior art apparatus.

DETAILED DESCRIPTION OF THE INVENTION

Figure 1:
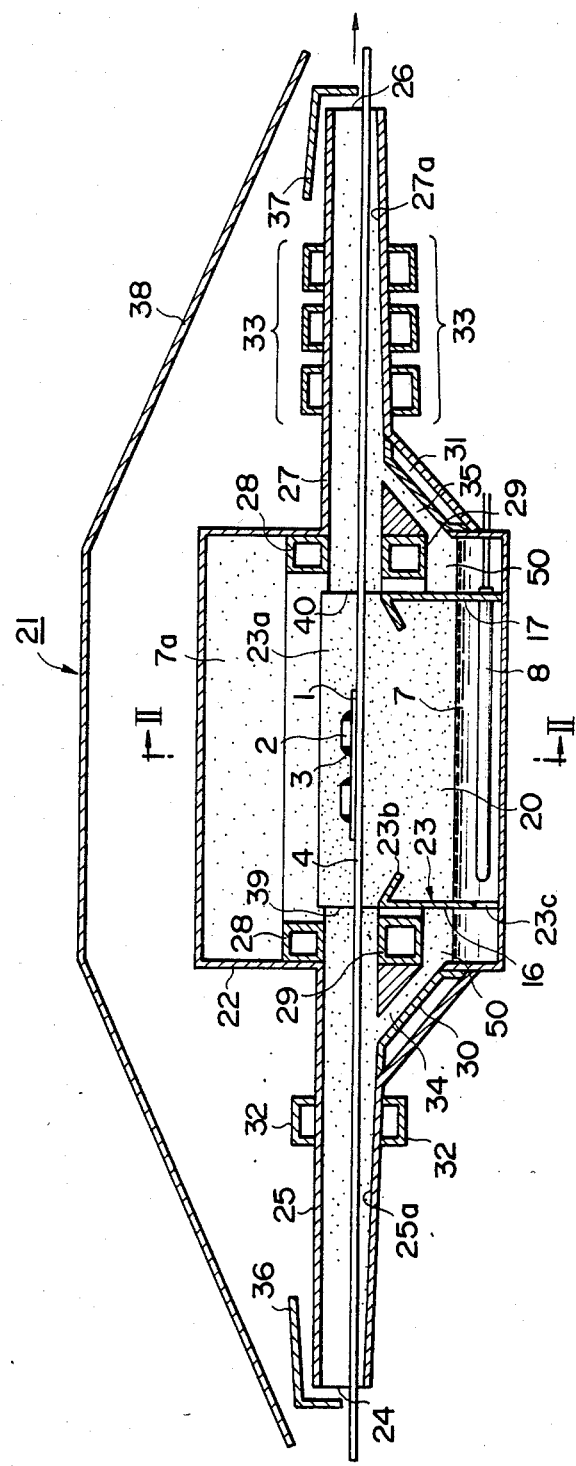
FIG. 1 is a side sectional view of the soldering apparatus.
Figure 2:
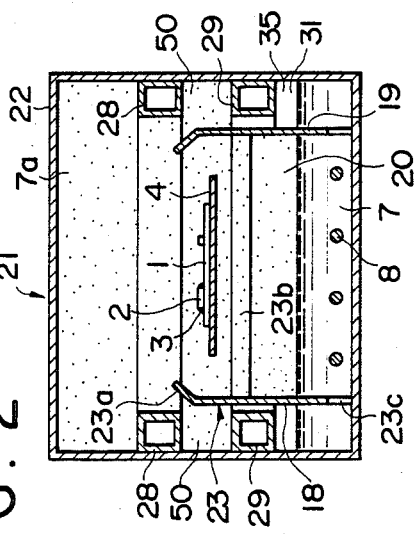
FIG. 2 is an end sectional view taken along section line II—II in FIG. 1.

One preferred embodiment of soldering apparatus according to the present invention is shown in FIGS. 1 and 2 in which the same reference numerals as in FIG. 8 designate similar component parts. The soldering apparatus, generally designated by the reference numeral 21, has a closed vessel 22, generally rectangular in horizontal cross section, for containing a heat transfer liquid 7 such as Florinate therein. Partition means 23 is provided within the vessel 22 for dividing the inside space of the vessel 22 into an inner, heating chamber 20 and an outer, cooling chamber 50. The partition means 23 is provided with one or more openings 23c at its lower portion so that the inner chamber 20 is in fluid communication with the outer chamber 50, i.e. the heat transfer liquid in the outer chamber 50 may enter the inner chamber 20 through the openings 23c.

The partition means 23 in this embodiment is composed of a pair of opposite, front and rear partition plates 16 and 17 and a pair of opposite, side partition plates 18 and 19. The partition plates 16 through 19 are disposed within the vessel 22 so that the inner chamber 20 is defined between the four partition plates and the outer chamber 50 is defined between the vessel side wall and the partition plates 16 through 19. As best seen from FIG. 1, the front and rear partition plates 16 and 17 terminate at a middle portion within the vessel 22 to form front and rear apertures 39 and 40 thereabove which serve to allow the passage of printed circuit boards therethrough as described hereinafter. The front and rear plates 16 and 17 have inwardly bent portions 23b at their top ends. The side partition plates 18 and 19 also terminate at a middle of the vessel 22 but above the top ends of the front and rear partition plates 16 and 17 and are inwardly bent as shown in FIG. 2. The side plates 18 and 19 may extend to the top end of the vessel 22, or may be deleted, if desired, however. The front and rear apertures 39 and 40 permit the fluid communication between the outer chamber 50 and the inner chamber 20.

Heating means 8 is provided at the bottom of the inner chamber 20 for heating the heat transfer liquid 7 in the inner chamber 20 to a temperature higher than its boiling point so that saturated vapors of the heat transfer liquid can fill the space above the liquid level of the heat transfer liquid 7 within the inner chamber 20.

Cooling means 28 and 29 are provided within the outer chamber 50 to condense the vapors of the heat transfer liquid which have escaped from the inner chamber 20 to the outer chamber 50 through the apertures 39 and 40. The cooling means 28 and 29 may be pipes through which a cooling medium cooled by any known means (not shown) is recirculated by pump means (not shown) for cooling the vapors of the heat transfer liquid by indirect heat exchange therewith. The pipe 28 in this embodiment is disposed at a level adjacent to the upper ends of the side partition plates 18 and 19 while the pipe 29 is disposed at a level adjacent to the upper ends of the front and rear partition plates 16 and 17.

A pair of conduits 25 and 27 are connected to the vessel 22. The conduits 25 and 27 have entrance and exit ports 24 and 26, respectively, through which printed circuit boards are fed to and discharged from the inner chamber 20, as described hereinafter. The conduits 25 and 27 have cooling means 32 and 33, respectively, for condensing the vapors of the heat transfer liquid escaped thereinto from the outer chamber 50. The conduits 25 and 27 have inclined bottoms 25a and 27a, respectively, so that the condensed liquid thereon may flow towards the vessel 22. Designated as 34 and 35 are byways provided with cooling means 30 and 31, respectively, to facilitate the collection of the condensed liquid in the vessel 22.

Conveying means 4 extends through the soldering apparatus 21 for supporting printed circuit boards 1 thereon and for conveying them through the conduit 25, outer chamber 50, inner chamber 20, outer chamber 50 and conduit 27. During the passage of the printed circuit boards 1 through the inner, heating chamber 20, the solder preforms 3 of electric components 2 on the printed circuit boards 1 are melted by contact with the vapors of the heat transfer liquid to effect soldering.

Since, in the soldering apparatus according to the present invention, the heating chamber 20 is separated from cooling chamber 50, it is possible to raise the soldering efficiency to any high rate without the loss of the heat transfer liquid 7. Conversely, the apparatus of the present invention permits intensive cooling for substantially complete condensation of the vapors of the heat transfer liquid without lowering the soldering efficiency. Further, the apparatus of the present invention has an additional advantage because of its compact and simple structure.

In FIG. 1, the reference numerals 36 and 37 indicate guide plates and 38 designates a cover for preventing the vapors of the heat transfer liquid from escaping out of the system to the air.

Figure 4:
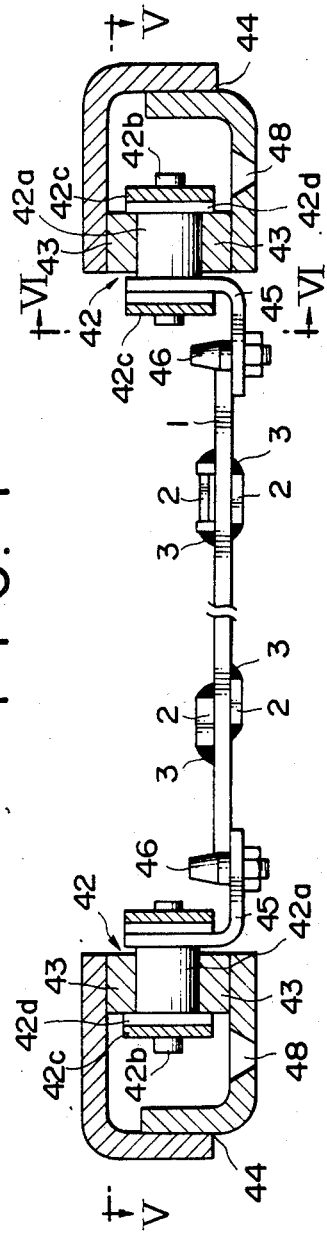
FIG. 4 is a sectional view of the conveyor and rails taken along section line IV—IV in FIG. 3.
Figure 3:
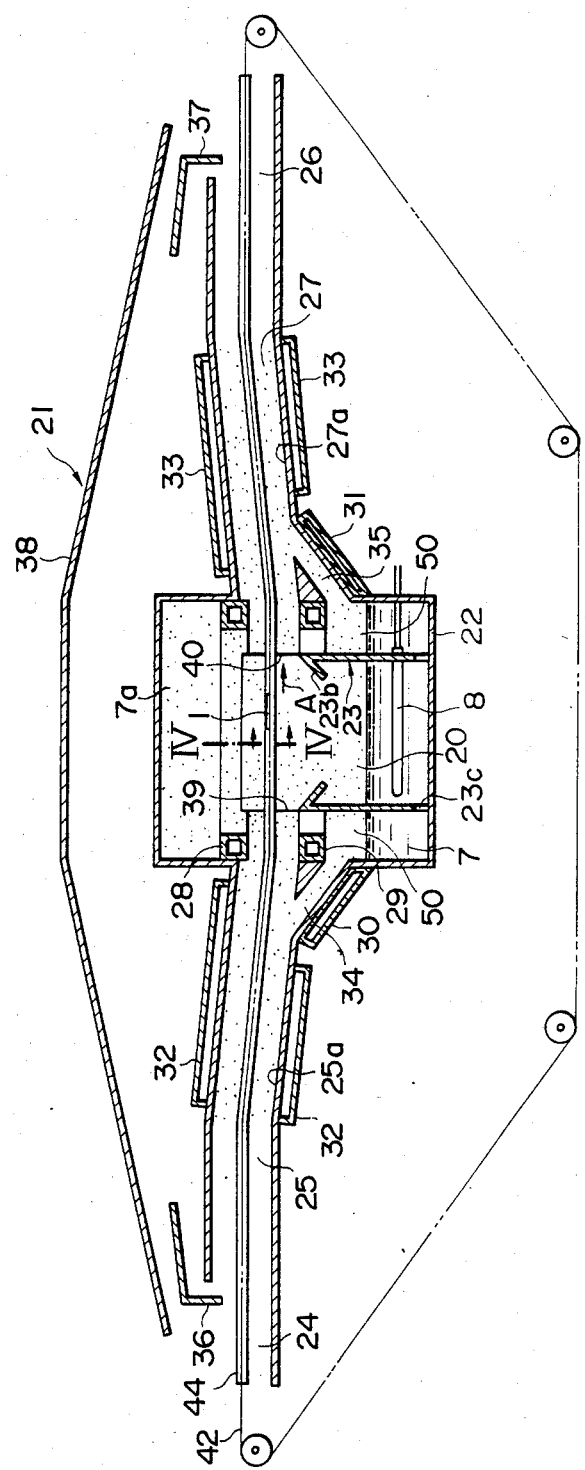
FIG. 3 is a side sectional view of the apparatus showing the conveyor and the inclined entrance and exist conduits.
Figure 5:
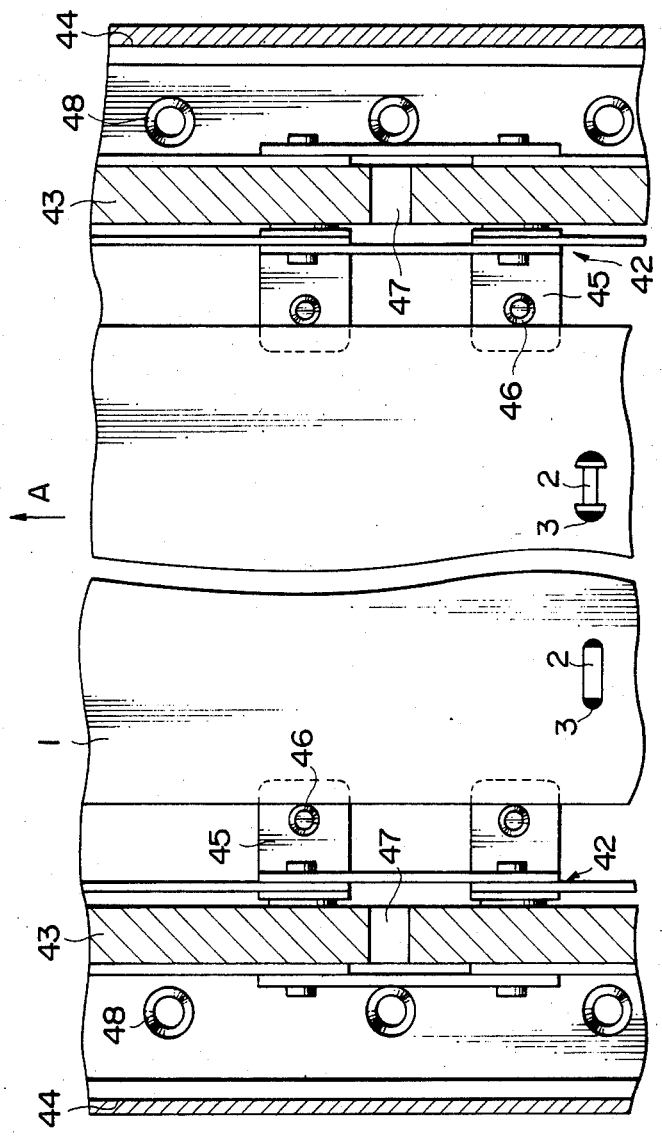
FIG. 5 is a plan view of the conveyor and rails taken along section line V—V in FIG. 4.
Figure 6:
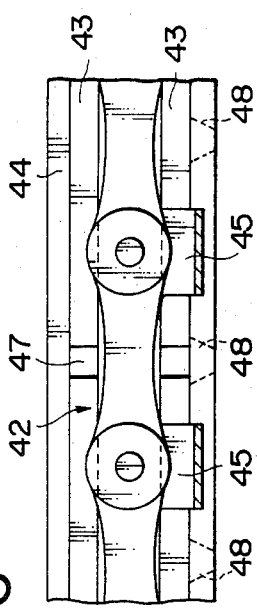
FIG. 6 is a side view of the chain of the conveyor in the rail.

The conveying means 4 may be a belt conveyor, conveyor chains with carriers for supporting printed circuit boards or carrierless conveying chains. FIGS. 3 to 6 depict a suitable embodiment of carrierless conveying chains assembly, in which the same reference numeral designate similar component parts. The reference numeral 44 designates a pair of parallel guide rails secured in the soldering apparatus 21 and extending through an entrance conduit 25, vessel 22 and exit conduit 27 to define therebetween a travelling path for printed circuit boards. As shown in FIG. 3, the conveying path is horizontal in the vessel 22 and is inclined upwardly in the entrance and exit conduits 25 and 27 so that the heat transfer liquid which deposits on the guide rails 44 can flow towards the vessel 22 by gravity. As shown in FIG. 4, each guide rail 44 is provided with a pair of upper and lower chain guides 43 between which chain rollers 42a of an endless conveyor chain, generally designated as 42, are disposed for rolling contact therewith. The conveyor chain 42 per se is conventional and is, for example, composed of a multiplicity of chain pins 42b each having a chain bush (not shown) and the roller 42a, and outside and inside link plates 42c and 42d. L-Shaped supporting plates 45 are secured to the bushes for supporting printed circuit boards thereon. Each supporting plate 45 has a stopper 46 to prevent lateral movement of the printed circuit board placed on the support plates 45. The position of the stopper 46 is adjustable to suit different printed circuit boards with various sizes.

Thus, by actuating sprockets, the conveyor chains 42 displace along the guide rails 44 with the printed circuit boards 1 being mounted on the support plates 45 and travelling along the predetermined path within the apparatus 21.

Incidentally, during the passage of the conveyor chains 42 through the soldering apparatus 21, vapors of the heat transfer liquid tend to condense and the condensed liquid will deposit on the conveyor chains 42. In order to prevent the discharge of the heat transfer liquid from the apparatus due to the carriage by the conveyor chains, a number of grooves or apertures 47 are formed in the upper and lower chain guides 43 at suitable intervals and, further, a number of throughholes 48 are formed in the bottom of the guide rails 44. Further, the rails 44 are inclined in the entrance and exit conduits portions so that the heat transfer liquid which deposits on the rails may flow towards the vessel 22. As a result, the condensed heat transfer liquid on the chains 42 may flow through the grooves 47 and the throughholes 48. The liquid which is dropped from the guide rails 44 flows on the slanted bottom 27a of the conduit 27 and returns to the vessel 22.

Figure 7:
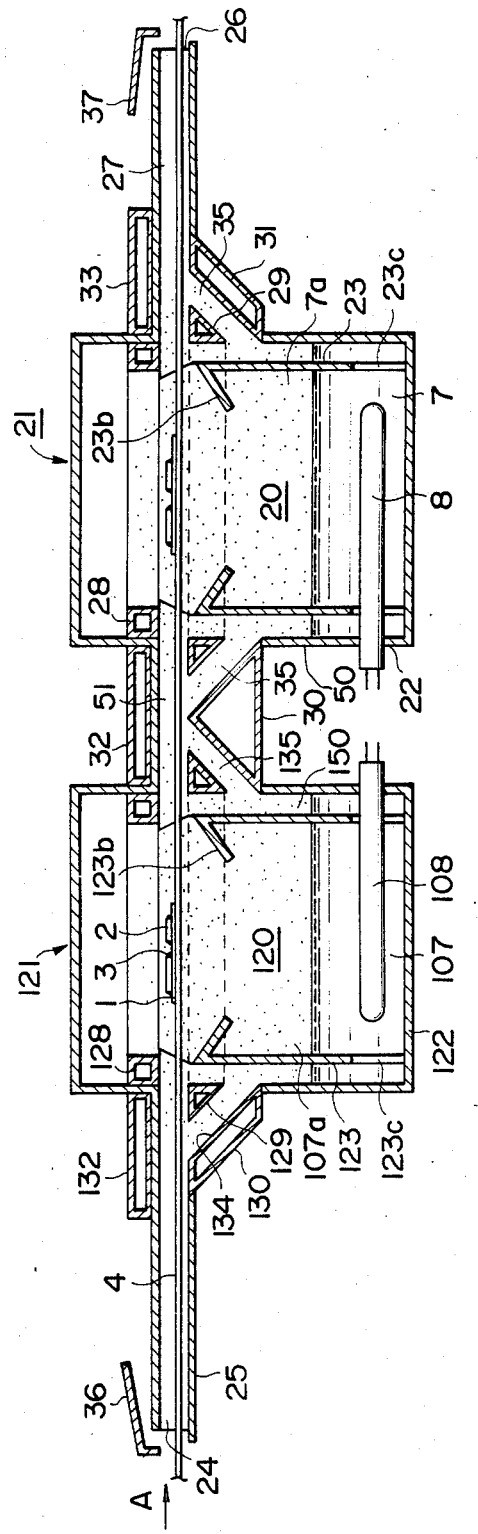
FIG. 7 is a side sectional view of another embodiment of the soldering apparatus having two closed vessels, the first being a preheating zone.

FIG. 7 depicts a modification of the soldering apparatus of FIG. 1, in which the same reference numerals designate similar component parts. In this embodiment, a preheating zone 121 is provided upstream from the soldering zone 21. As seen from FIG. 7, the structure of the preheating zone 121 is the same as that of the soldering zone 21. Thus, corresponding parts have been designated by the same reference numerals as part of "100" series.

The preheating zone 121 has a vessel 122 for containing a first heat transfer liquid 107 having a boiling point (150° C., for example) lower than the melting point of solder preforms 3 with which electric parts 2 are temporarily mounted on printed circuit boards 1. On the other hand, the soldering zone 21 uses a second heat transfer liquid having a boiling point (215° C., for example) higher than the melting point of the solder preforms 3. A conveying means 4 such as a belt conveyor is provided within the preheating and soldering zones 121 and 21 to convey each printed circuit board 1 in the direction shown by the arrow A through a conduit 25, outer chamber 150, inner chamber 120, outer chamber 150, connecting conduit 51, outer chamber 50, inner chamber 20 and conduit 27.

In the inner chamber 120, the solder preforms 3 on the printed circuit board 1 are preheated by contact with the saturated vapors of the first heat transfer liquid produced by heating with a heating means 108 disposed at the bottom of the inner chamber 120. The preheated printed circuit board 1 is then passed to an inner chamber 20 of the soldering zone 21 through the connecting conduit 51 where the preheated solder preforms are melt by contact with the saturated vapors of the second heat transfer liquid. Outer chambers 150 and 50 are provided with cooling means 128, 129, 28 and 29 to condense the vapors of the heat transfer liquid comming from the inner chambers 120 and 20. Cooling means 130, 132, 30, 32, 31, 33 are also provided in the conduits 25, 51 and 27. The vapors of the first and second heat transfer liquids in the connecting conduit 51 are condensed by the cooling means 32 and returns, respectively, to the preheating and soldering zones 121 and 21 through the pathways 135 and 35, respectively.

By providing the preheating zone 121, it is possible to increase the rate at which the printed circuit boards travel through the apparatus. Further, the amount of the higher boiling point heat transfer liquid which is expensive may be advantageously reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

I claim:

1. An apparatus for soldering printed circuit boards having electric components mounted thereon with solder preforms, comprising:
   a closed vessel for containing a heat transfer liquid having a boiling point higher than the melting of the the solder preforms;
   vertical partition means provided within said vessel for dividing the inside space of said vessel into an inner, heating chamber defined by said partition means and an outer, cooling chamber defined between said partition means and said vessel;
   an opening provided in a lower portion of said partition means so that the heat transfer liquid in said cooling chamber may enter said heating chamber therethrough;
   front and rear apertures provided in upper portions of said partition means to allow the passage of the printed circuit boards therethrough;
   heating means provided in said heating chamber to heat the heat transfer liquid in said heating chamber to a temperature higher than the boiling point of the heat transfer liquid;
   cooling means provided within said cooling chamber for condensing vapors of the heat transfer liquid in said cooling chamber;
   entrance conduit means having an entrance port for printed circuit boards at its one end and connected to said vessel at its the other end;
   exit conduit means having an exit port for printed circuit boards at its one end and connected to said vessel at its the other end; and
   conveying means adapted for conveying printed circuit boards successively through said entrance port, entrance conduit means, cooling chamber, front aperture, heating chamber, rear aperture, cooling chamber, exit conduit means and exit port, whereby said heating means heat the heat transfer liquid in said heating chamber to vaporize same and to form saturated vapors of said heat transfer liquid within said heating chamber, the printed circuit boards conveyed by said conveying means through said heating chamber being brought into contact with said saturated vapors so that the solder preforms can melt, and the vapors of said heat transfer liquid which escaped from said heating chamber to said cooling chamber through said front and rear apertures are cooled and condensed by said cooling means in said cooling chamber for recovery.

2. An apparatus according to claim 1, further comprising means provided in said entrance and exit conduit means for condensing vapors of the heat transfer liquid which are present within said entrance and exit conduit means, respectively.

3. An apparatus according to claim 2, wherein each of said entrance and exit conduit means has an inclined bottom so that the heat transfer liquid thereon can flow towards said vessel.

4. An apparatus according to claim 1, wherein said front and rear apertures are positioned so as to permit the formation of substantially horizontal path within said vessel along which the printed circuit boards are conveyed by said conveyor means.

5. An apparatus according to claim 1, wherein said conveying means comprises:
   a pair of guide rails each having a C-shaped cross section and extending through said entrance conduit means, cooling chamber, heating chamber and exit conduit means to define therebetween a conveying path which is horizontal in said vessel and inclined upwards in said entrance and exit conduit means so that the heat transfer liquid which deposits thereon in said entrance and exit conduit means can flow towards said vessel by gravity;
   a pair of upper and lower chain guides provided at open ended portion of each of said guide rails;
   a pair of endless conveyor chains respectively supported and guided by said upper and lower chain guides of said paired guide rails;
   a plurality of support members secured to said conveyor chains for supporting the printed circuit boards thereon, so that each printed circuit board supported by said support members can travel along said conveying path upon running of said paired conveyor chains;
   a plurality of spaced apart cut away portions provided in each of said upper and lower chain guides so that the heat transfer liquid which deposits on said conveyor chains may be caught in said cut away portions and transferred to the bottoms of said guide rails; and
   a plurality of perforations provided in the bottom of said guide rails so that the heat transfer liquid in the guide rails can be discharged therethrough from said guide rails.

6. An apparatus for soldering printed circuit boards having electric components mounted thereon with solder preforms, comprising:
   a first closed vessel for containing a first heat transfer liquid having a boiling point lower than the melting of the the solder preforms;
   a second closed vessel for containing a second heat transfer liquid having a boiling point higher than the melting of the the solder preforms;
   first vertical partition means provided within said first vessel for dividing the inside space of said first vessel into an inner, first heating chamber defined by said first partition means and an outer, first cooling chamber defined between said first partition means and said first vessel;

second vertical partition means provided within said second vessel for dividing the inside space of said second vessel into an inner, second heating chamber defined by said second partition means and an outer, second cooling chamber defined between said second partition means and said second vessel;

a first opening provided in a lower portion of said first partition means so that the first heat transfer liquid in said first cooling chamber may enter said first heating chamber therethrough;

a second opening provided in a lower portion of said second partition means so that the second heat transfer liquid in said second cooling chamber may enter said second heating chamber therethrough;

a pair of first front and first rear apertures provided in upper portions of said first partition means to allow the passage of the printed circuit boards therethrough;

a pair of second front and second rear apertures provided in upper portions of said second partition means to allow the passage of the printed circuit boards therethrough;

first heating means provided in said first heating chamber to heat the first heat transfer liquid in said first heating chamber to a temperature higher than the boiling point of the first heat transfer liquid;

second heating means provided in said second heating chamber to heat the second heat transfer liquid in said second heating chamber to a temperature higher than the boiling point of the second heat transfer liquid;

first cooling means provided within said first cooling chamber for condensing vapors of the first heat transfer liquid in said first cooling chamber;

second cooling means provided within said second cooling chamber for condensing vapors of the second heat transfer liquid in said second cooling chamber;

entrance conduit means having an entrance port for printed circuit boards at its one end and connected to said first vessel at its the other end;

exit conduit means having an exit port for printed circuit boards at its one end and connected to said second vessel at its the other end;

connecting conduit means extending between said first and second vessels to allow the passage of the printed circuit boards from said first to second vessels therethrough and provided with a cooler for condensing vapors of said first and second heat transfer liquids therewithin; and conveying means adapted for conveying the printed circuit boards successively through said entrance port, entrance conduit means, first cooling chamber, first front aperture, first heating chamber, first rear aperture, first cooling chamber, connecting conduit means, second cooling chamber, second front aperture, second heating chamber, second rear aperture, second cooling chamber, exit conduit means and exit port, whereby said first and second heating means heat the first and second heat transfer liquids in said first and second heating chambers, respectively, to vaporize same and to form saturated vapors of said first and second heat transfer liquids within respective heating chambers, the printed circuit boards conveyed by said conveying means being brought into contact first with said saturated vapors of said first heat transfer liquid in said first heating chamber so that the solder preforms can be preheated and then with said saturated vapors of said second heat transfer liquid in said second heating chamber so that the preheated solder preforms can melt, and the vapors of said first and second heat transfer liquids which escaped respectively from said first and second heating chambers to said first and second cooling chambers, respectively, through said first and second front and rear apertures, respectively, are cooled and condensed by said first and second cooling means in said first and second cooling chambers, respectively, for recovery.

* * * * *